United States Patent Office 3,121,674
Patented Feb. 18, 1964

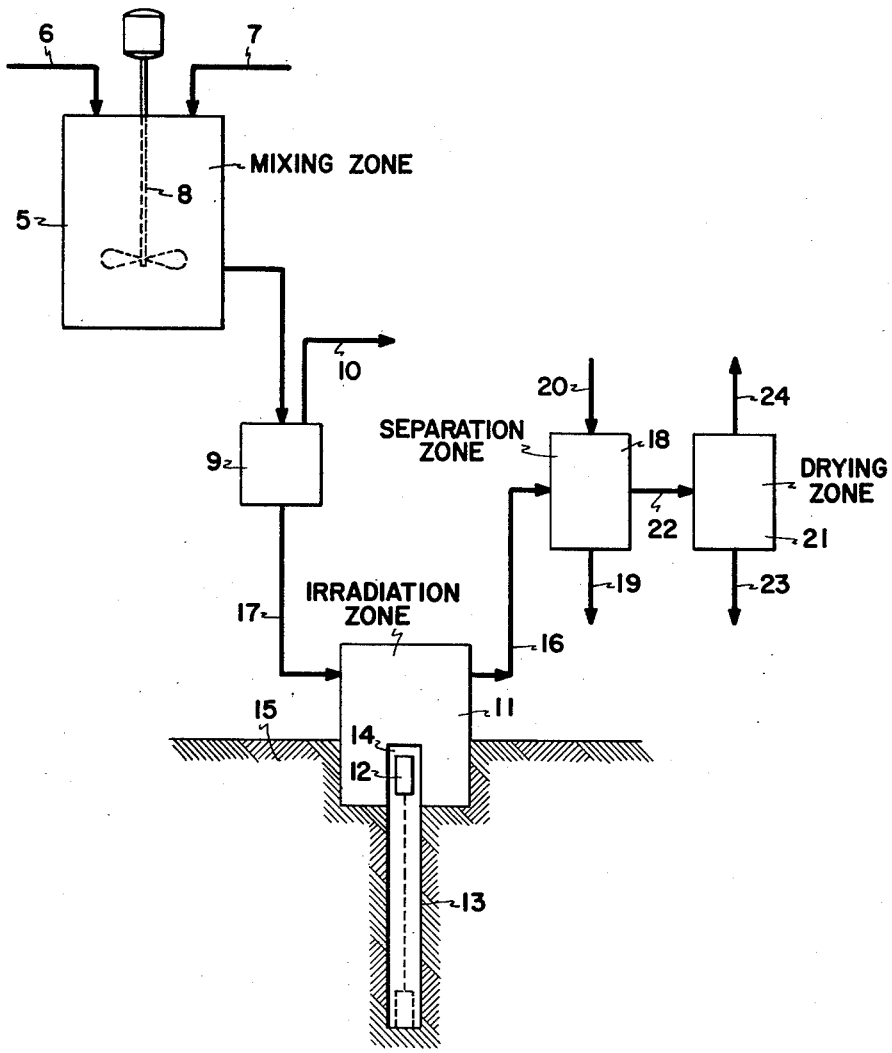

3,121,674
IRRADIATION OF POLYMERIC COMPOUNDS
Donald A. Guthrie, Cranford, N.J., assignor to Esso Research and Engineering Company, a corporation of Delaware
Filed Oct. 30, 1959, Ser. No. 849,879
5 Claims. (Cl. 204—162)

This invention relates to the irradiation of polymeric compounds. In one aspect, it relates to a method for selectively reducing the molecular weight of aqueous dispersions of polymers and copolymers of isobutylene by exposing such polymers to ionizing radiation. In another aspect, it concerns the depolymerization of concentrated stable emulsions of the aforementioned polymers in water and/or alcohol.

The preparation and uses of polymers and copolymers of isobutylene are well known. High molecular weight polymers made with isobutylene are extensively utilized as a replacement for natural rubber and are also utilized, for example, in the formulation of adhesive compounds such as pressure-sensitive tapes, cements, as binders in caulking compounds, as modifiers in petroleum asphalts and the like. Also, polymers of isobutylene and copolymers of isobutylene (containing a high isobutylene content) which have viscosity average molecular weights in the range of about 45,000 to 250,000 are utilized extensively as viscosity index improvers for lubricating oils. Similar polymeric compounds having molecular weights above about 250,000 are not generally used as viscosity index improvers in lubricating oils as they suffer from the drawback that they degrade severely and lose much of their viscosity index improving properties when subjected to the high rates of shear which lubricating oils are normally expected to withstand.

Currently, high molecular weight polymers containing large amounts of isobutylene and having high molecular weights (in the range of 225,000 to 6,000,000) are depolymerized or degraded to produce viscosity index improvers, etc. having molecular weights in the range of about 45,000 to 250,000. Viscosity index improvers produced in this manner are often superior in shear stability to those produced by direct polymerization. For instance, butyl rubber (a copolymer of a monoolefin and a diolefin) having a viscosity average molecular weight in the range of about 225,000 to 6,000,000 is generally subjected to severe heat as well as chemical and mechanical degradation to produce lower molecular weight compounds which are useful as viscosity index improvers. However, this treatment causes color degradation in the product, and requires expensive equipment and high maintenance costs. Recently, it has been found that isobutylene-containing polymers can be depolymerized by irradiating them either in solid form or as hydrocarbon solutions. While these processes have their advantages, there are several difficulties associated with continuous processes involving such treatments. One such difficulty is that when solids are irradiated they are difficult to handle because they do not flow and become tacky after the irradiation treatment; another problem is that only very dilute hydrocarbon solutions can be used because concentrated solutions, e.g. 10 wt. percent, are often too viscous to pump with conventional equipment. Furthermore, since the energy requirement in a solution process is inversely proportional to the concentration of the isobutylene polymer in the solvent, the utilization of radiation energy is quite low at pumpable polymer concentrations, e.g. 3 wt. percent hexane solution.

It has now been discovered that the molecular weight of polymers, e.g., copolymers made with isobutylene as one of the monomers, may be reduced by exposing an aqueous or alcohol emulsion of the polymer to ionizing radiation. The polymer is dispersed in an oxygen-containing liquid, e.g. water and/or alcohol, to make a concentrated emulsion having a relatively low viscosity which is highly suitable for an irradiation depolymerization process. Water is the preferred medium or continuous phase because aqueous emulsions have excellent stability. Of course, as will be shown later it is not necessary to prepare a stable emulsion since sometimes it is more desirable to make temporary dispersions which are easy to break after the irradiation treatment.

In general the molecular weights of such polymeric compounds are reduced by at least about 1% when treated in accordance with the novel process to be hereinafter described. However, if desired, a smaller reduction may be obtained especially with lower molecular weight polymers, e.g. 5,000 to 30,000. The invention may be used to produce specification butyl rubber, Vistanex and the like from off-specification products, i.e. polymers which have undesirably high molecular weights. The irradiation process described herein may be employed to prepare viscosity index improvers for lubricating oils, adhesives, etc.

The accompanying drawing is a diagrammatic flow diagram of a preferred embodiment of the process.

The polymers prepared in accordance with the present invention are superior to those prepared by the prior art methods (including those additives prepared by direct polymerization and by molecular weight degradation). More specifically, the color of the polymer product is superior to those prepared from say butyl rubber by conventional milling processes. Another benefit derived from this invention is that the molecular weight of the product can be closely controlled simply by adjusting the concentration of the dispersion and/or the throughput rate. Other processes often have great difficulty maintaining the desired level of breakdown.

In accordance with the invention certain oxygen-containing liquids are used to greatly improve irradiation energy utilization in the depolymerization of polymers and thus make such methods commercially attractive as compared with other solution processes which have much lower efficiency. Broadly speaking, nonsolvent liquids having the following formula may be employed in the practice of the invention:

$$ROH$$

wherein "R" is hydrogen, a $C_1$ to $C_5$ alkyl or a $C_1$ to $C_5$ monohydroxyalkyl; "H" is hydrogen; and "O" is oxygen. The preferred alkyls and hydroxyalkyls have 1 to 3 carbon atoms. The organic liquids coming within the scope of this invention may be generically described as lower molecular weight aliphatic monohydric and dihydric alcohols. Among the organic liquids which are useful in carrying out the invention are methanol, ethanol, propylene glycol, 1-pentanol, ethylene glycol, isopropanol, 1,4-butanediol and n-butanol. Because water is the preferred liquid, the description of the invention will be primarily directed to the use of aqueous polymer emulsions.

Isobutylene polymers useful in the present invention should contain at least about 5 wt. percent isobutylene. Most of the polymers coming within the purview of the invention contain a major proportion of isobutylene and preferably contain about 95 to 99 or 100 wt. percent isobutylene. Among the polymers that can be depolymerized by irradiation are Vistanex, a homopolymer of isobutylene, and butyl rubber, a copolymer containing a major proportion, generally 90–99.5 wt. percent of isobutylene and a minor proportion of diolefin, e.g. isoprene, a copolymer of isobutylene and styrene (generally containing about 20 to 60 wt. percent of the isobutylene component) and copolymers of isobutylene with vinyl toluene, vinyl ethers, butadiene, maleic anhydride, vinyl trichlorosilane, acrylonitrile, etc. Of the foregoing, polyisobutylene and butyl rubber are the preferred polymers.

The molecular weights of the polymers useful in this invention are generally in the range of about 5,000 to 6,000,000 or higher. Normally, the polymeric compounds irradiated in accordance with the present invention have viscosity average molecular weights in the range of about 5,000 to 2,000,000. The methods for preparing these polymers and copolymers of isobutylene are well known in the art and any suitable method for making them may be employed.

When the polymers are dispersed in a substantial amount, e.g. at least 30 wt. percent of the oxygen-containing liquid medium, they are readily depolymerized by exposure to radiation doses of about 50,000 to 5,000,000 roentgens per hour. In many instances it is desirable to make a stable emulsion of the polymer and irradiate the emulsion; however, if rapid separation of the polymer from the liquid medium after the treatment is advantageous, a simple dispersion can be employed. The concentration of polymer in the dispersion (or emulsion) will vary according to the viscosity of the dispersion and other factors. In general, the amount of polymer dispersed in the liquid will be between about 1 and 60 or 70 wt. percent. For economic reasons it is best to use concentrated solutions, e.g. 30 to 50 wt. percent solutions. Because the more concentrated solutions have such high energy utilization, one can effect a given amount of depolymerization (using a given sized source) at a rate which is 6 to 10 times faster when the process is carried out as a 40% aqueous emulsion than when a 3% hexane solution is used.

The polymer solutions may be prepared according to known commercial methods for making latices and dispersions. For instance the polymer may be dissolved in a suitable solvent, e.g. a $C_5$ to $C_8$ hydrocarbon or $C_1$ to $C_5$ halogenated hydrocarbon, and the resulting cement can be introduced into an aqueous or alcoholic liquid containing an emulsifier. Typical polymer solvents are hexane and chloroform. While the cement may comprise a 1 to 30 wt. percent solution, solutions of intermediate concentration, e.g. 10 to 20 wt. percent, are preferred. About 0.05 to 2 parts by weight of the polymer is admixed with each part of the liquid medium, e.g. water or a monohydric alcohol, at about 20 to 60° C. using an efficient dispersing means. After mixing for about 5 to 60 minutes the dispersion is usually stripped of all or part of the solvent under a partial vacuum, e.g. 0.1 to 0.3 atmosphere. The dispersion is then exposed to a specific dose of radiation, the emulsion is broken, for instance by adding alum to the mixture, and the depolymerized polymer is withdrawn from the upper layer of the liquid mixture. The polymer may thereafter be dissolved in a mineral oil or some other solvent and added to a lubricating oil or used to treat plastic strips to make adhesive tapes.

In one embodiment of the invention the liquid medium is free of emulsifiers and only a temporary dispersion is formed which must be used immediately. This process has the advantage of eliminating stripping the solvent prior to treatment and permitting rapid separation of the polymer from the liquid medium in a settling zone. If desired the wet depolymerized product can be dried by introducing it into a hot hydrocarbon oil having a boiling point above the liquid in which the polymer was dispersed.

Among the types of radiation that are suitable for the purposes of the invention are high energy electromagnetic radiation such as gamma rays and X-rays and high velocity electrons, as well as beta rays, alpha particles, and neutrons. These types of radiation can be supplied by naturally occurring radioactive materials or by common neutron sources. Fission by-products of processes generating atomic power or fissionable materials which emit high energy gamma rays afford a highly desirable and most abundant source of radioactivity suitable for the purposes of invention.

Irradiation can also be obtained from nuclear reactors such as atomic piles. In this form of the invention wherein neutrons are used, it is preferred that the neutron flux in the radiation zone be above $10^8$ neutrons/cm.$^2$/second besides maintaining an appreciable gamma-ray dosage. Conventional moderators can, of course, be used, such as water, carbon, and hydrocarbons. In some cases the feed stream itself can serve as a moderator. Materials made radioactive by exposure to neutron irradiation, such as radioactive cobalt$^{60}$ which emits gamma rays can likewise be used. Suitable sources of high velocity electrons are the beams of electron accelerators such as the Van de Graaff Electrostatic Accelerator. In general, however, high velocity electrons, high energy gamma rays and neutrons are preferred for the purposes of this invention, mainly because of the high penetrating power of these rays and/or the availability and ease of application of these sources of energy. By high energy ionizing radiation is meant, the radiation from terrestrial sources of sufficient energy that the dose rate is at least $1 \times 10^{-4}$ kwh. per pound of hydrocarbon reactant per hour. This excludes radiation such as cosmic and ultraviolet which are ineffectual for the purposes of this invention.

The reduction in the molecular weight and modification of the polymeric compounds by exposure to radiation is a function of the radiation dosage (roentgens). More specifically, the reduction in molecular weight will be a function of the rate of radiation (roentgens per hour) and the time of radiation (hours). Generally, radiation intensities of about 50,000 to greater than 5,000,000 roentgens per hour will be employed. Certain polymeric compounds, such as butyl rubber, for example, may contain small amounts of stabilizers such as zinc stearate. Additives such as these may reduce the degree of molecular weight reduction for a given dosage of radiation (as compared to polymeric compounds consisting essentially of the pure polymer or copolymer). In such cases, higher dosages of radiation (i.e., longer irradiation times and/or greater irradiation intensities) would be required to produce an equivalent reduction in molecular weight.

Radiation sources having in the range of about 50 curies to 1000 kilocuries, for example, will generally be employed, although sources having lesser or greater amounts of radiation may be employed if desired. Irradiation times of about 0.5 to 24 hours are preferred. However, greater or lesser radiation times may be employed depending upon the strength of the sources of radiation and the degree of molecular weight reduction desired.

The degree of reduction in molecular weight desired will depend, of course, upon the molecular weight of the original polymer and the desired molecular weight of the final irradiated product. If the irradiation is to be employed to produce specification butyl rubber, polyisobutylene, etc., the amount of reduction in molecular weight may be quite small if the material irradiated has a molecular weight that is only slightly in excess of the specification molecular weight. On the other hand, if high molecular weight polymeric compounds, such as those having molecular weights above 1,500,000 are to be reduced in molecular weight to form, for instance, viscosity index improvers having molecular weights in the range of 45,000 to 250,000, a substantial decrease in molecular weight is involved. In general, the degree of reduction in molecular weight involved in producing viscosity index improvers will be at least about 5% and generally at least about 25%. If desired, the irradiation of the polymeric compound may be continued until the molecular weight of the compound is reduced to about 5,000. Polymers of isobutylene which have viscosity index improving properties have viscosity average molecular weights in the general range of about 7,000 to 500,000. Preferred viscosity index improvers have molecular weights in the range of about 45,000 to 250,000.

Referring now to the accompanying drawing which shows a preferred method of carrying out the present invention, the polymer to be irradiated is converted into a 40 wt. percent aqueous emulsion by adding 17.5 parts by weight of the polymer in the form of a 10 wt. percent hexane solution to a mixing zone 5 which contains 290 parts by weight of water with 2 parts by weight of sodium lauryl sulfate and 0.5 part of sodium dihydrogen phosphate through line 6. The mixture of the water and emulsifying agent are introduced into zone 5 through line 7. The polymer is dispersed with the water in zone 5 by means of an efficient stirrer 8 at about 20° C. for 30 minutes and then the raw emulsion is transferred to stripping zone 9 which is at 30 to 60° C. and under reduced pressure (0.05 to 0.3 atmosphere). The hydrocarbon solvent and excess water are taken off overhead through line 10 and the stripped product is transferred via line 17 to irradiation zone 11 which has a radiation source 12 that can be raised and lowered in a conduit 13 which terminates at one end in an indentation 14 in the bottom of irradiation zone 11. The other end of the conduit 13 is surrounded by a shielding means 15, such as the earth. The radiation source 12 can be lowered into the shielded area when not being used to treat the polymer. The depolymerized isobutylene polymer is withdrawn from irradiation zone 11 through line 16 and transferred to separating zone 18 where the emulsion is broken by adding 10 parts by weight of alum per part of emulsifier. Once the emulsion is broken the liquid mixture commences to form two distinct layers. The polyisobutylene product is concentrated in the upper organic layer and the deactivated emulsifier is concentrated in the lower aqueous layer. In order to facilitate handling of the depolymerized polyisobutylene, it is advantageous to add a sufficient amount of organic solvent (such as naphtha, hexane, chloroform, dichloromethane or lubricating oil base stock) to the separated mixture through line 20. Sufficient solvent should be introduced into settling zone 18 to produce a fluid organic layer which can be easily transferred from one zone to another by pumping. Thereafter the aqueous layer is drawn off through line 19 and discarded. The polymer solution is then transferred to drying zone 21 through line 22 and there it may be dried in two ways. If the solvent has a high boiling point (e.g. a lubricating oil) the mixture is simply heated to a sufficiently high temperature, e.g. 100° C., to remove any residual water present in the polymer solution. The water vapor driven from the polymer solution is withdrawn from drying zone 21 through line 24. If volatile solvents (e.g. hexane) are employed the solution is dried by contacting with drying agents, such as silica gel, calcium sulfate or the like. The dried polymer product solution is withdrawn from drying zone 21 through line 23.

Of course, there are many obvious variations to the foregoing process which are apparent to those skilled in the art and it is not intended to exclude them from the process. For instance the drying zone can be eliminated by heating the mineral oil while in settling zone 18 so that the emulsion is simultaneously broken, separated and dried in a single zone. Also, the emulsifying agent may be eliminated by forming a fine dispersion of the cement in the aqueous solution and immediately irradiating it before a substantial separation occurs.

Many different emulsifiers may be employed, including any one or more of the numerous nonionic and anionic emulsifying agents which are commercially available. Among the nonionic emulsifiers which have been found to be useful are the polyoxyalkenated alkyl phenols or alcohols having the general formula

R(OCHR₁CHR₁)ₙOH wherein R is an alkyl, aryl or alkaryl group, R₁ is an alkyl group or hydrogen and n is an integer of 4 to 8 or 10. The alkene oxide units should comprise at least 40 wt. percent of the total molecular weight of the compound. Suitable emulsifiers are ethylene oxide adducts of nonyl phenol and tridecyl alcohol. The compounds may be prepared by condensing an alkyl phenol or alcohol with either ethylene oxide or propylene oxide and may be further reacted with organic acids to give derivatives, such as polyoxyethylene sorbitan monopalmitate or polyoxyethylene sorbitol monooleate.

Among the anionic emulsifiers which may be used to prepare the emulsions employed in the present process are sodium lauryl sulfate, sodium oleyl taurate, potassium oleate, the sulfated sodium salt of tridecoxypolyethoxyethanol and the sulfated sodium salt of nonylphenoxypolyethoxyethanol.

Normally the irradiation will be carried out at atmospheric temperatures and pressures. Lower or higher temperatures in the range of about 0 to 150° C. may be employed. Of course, the reaction proceeds at a faster rate at the higher temperatures and at temperatures below 0° C. freezing of the solution of the polymeric compound may cause breaking of the emulsion when water is the continuous phase. Temperatures below 0° C. may be employed when alcohols are used in place of water. On the other hand, at temperatures above about 150° C., thermal decomposition of the polymer and volatilization of the solvent may be encountered. Superatmospheric pressures, e.g. up to 20 atmospheres, are necessary at temperatures near or above the boiling point of the solvent. Subatmospheric pressures may also be employed when necessary.

The molecular weight may be determined in several ways. One way of determining the molecular weight is by the viscosity method. One type of molecular weight determined by this method is known as the viscosity average molecular weight and this molecular weight is used herein. In this method the molecular weights of polymeric substances are expressed by the formula:

$$[\eta] = kM_v^a$$

where $M_v$ represents the viscosity average molecular weight and $k$ and $\alpha$ are constants depending on the solvent and polymer type. $[\eta]$ represents the intrinsic viscosity which is defined by the following equation:

$$[\eta] = \frac{23.03 \times \log \frac{\text{Viscosity of solution}}{\text{Viscosity of solvent}}}{\text{Mg. of polymer per ml. of solution}}$$

This method is set forth on pgs. 308–314 of the book "Principles of Polymer Chemistry," by P. J. Flory, published by Cornell University Press, Ithaca, New York, 1953.

The exposure of the polymeric compound to the radiation from the radioactive materials may be carried out either in a batch operation or a continuous operation. It is important in either operation, in order to obtain the most desirable results, to uniformly irradiate the polymer. There are a number of ways other than those described herein in which the irradiation may be carried out which will be obvious to those skilled in the art. For example, an emulsion of the polymeric compound in a shielded container may be irradiated by suspending a radiation source in the solution. Also, if desired, the solution of the polymeric compound may be introduced into a container surrounded by a source of radiation. In a continuous process of irradiation, the emulsion of the polymeric compound may be pumped continuously through a conduit placed in the source of radiation. For example, the solution may be passed through a conduit immersed in an underground pit filled with fission products of atomic piles, or the solution may be continuously pumped at a uniform rate through an atomic reactor where the solution will be irradiated with gamma rays and neutrons produced in the atomic reactor.

The invention will be more fully understood by reference to the following examples. It is pointed out, however, that the examples are given for the purpose of illustration only and are not to be construed as limiting the scope of the invention.

EXAMPLE 1

An emulsion of polyisobutylene having a viscosity average molecular weight of 1,000,000 is prepared by dispersing 100 parts by weight of a polyisobutylene as a 10 wt. percent hexane solution in 1000 parts by weight of water containing emulsifiers comprising 3 parts by weight of potassium oleate, 2.4 parts by weight of Triton X–100, a trade name of Rohm & Haas Co. for an ethylene oxide adduct of nonyl phenol (ca. 9 ethylene oxide units), and 2.1 parts by weight of polyvinyl alcohol. The mixture was homogenized in a dispersator at 30° C. for 30 minutes. Thereafter the raw emulsion was heated at 40° C. under about 0.1 atmosphere pressure to remove the hexane solvent and excess water. The resulting emulsion, which contained 37 wt. percent polyisobutylene, was placed in glass tubes approximately 1.5 to 2 cm. in diameter and 24 cm. in length, and after stoppering, the tubes were placed near a 2800 curie cobalt$^{60}$ gamma radiation source which was a cylinder about 2″ in diameter and 13″ in length. The radiation intensities at the two different distances from the source chosen for this experiment were 56,900 and 149,500 roentgens/hour, respectively. The emulsion samples were irradiated for 16.8 hours at these dose rates at room temperature. The radiation treatment described above was repeated with the same polyisobutylene polymer both in solid form and in hexane solutions of various concentrations.

The polymer was isolated by adding 10 parts by weight of acetic acid to 100 parts of the irradiated emulsion. The control, which was a non-irradiated blank of the same emulsion, was isolated in the same way. The precipitated polymer was dissolved in hexane, and then washed with a dilute aqueous sodium hydroxide solution, followed by water. Each sample was dried over anhydrous calcium sulfate. The polymer was isolated from solution, dried and the molecular weight determined by viscosity measurements in diisobutylene. The results are summarized below in Table I:

*Table I.—Radiation Depolymerization of Polyisobutylene*

[37% polymer emulsion]

| Radiation Dose (Megaroentgen) | Polymer Recovery (Wt. Percent) | Intrinsic Viscosity | Viscosity Average Molecular Weight |
|---|---|---|---|
| 0 | 100 | 2.36 | 1,000,000 |
| 1.0 | 98 | 1.04, 1.07 | 285,000 |
| 2.5 | 98 | 0.73 | 160,000 |

The polymers irradiated as solids as well as hexane solutions were evaluated in the same manner to determine the resulting decrease of molecular weight.

A comparison of the molecular weights of the polyisobutylene samples showed that it required about three times the amount of radiation to depolymerize a unit weight of the polymer in emulsion form than it required to depolymerize solid polyisobutylene to the same degree. These data are shown in Table II.

*Table II.—Depolymerization of Vistanex in Emulsion Form*

| | Radiation Dose Required to Depolymerize to 130,000 $M_v$ (Megaroentgen/gm. of Polymer) | |
|---|---|---|
| | As a Solid | As a 37% Emulsion |
| Initial Polyisobutylene ($M_v$=1,000,000) | 3.1 | 9.0 |

However, this increase in radiation requirement is a small factor when consideration is given to the difficulties encountered in handling solid tacky polyisobutylene. Moreover, the additional energy required to break each polymer chain in an aqueous emulsion of the polymer is small in comparison to the amount of energy required to do the same thing in a hydrocarbon solution. It was found that about twenty-one times more radiation was required to depolymerize a gram of polyisobutylene when it was irradiated in the form of a 3 wt. percent hexane solution than the amount of radiation required for the solid polymer. The data presented in Table III show the energy requirements for each break in a polyisobutylene polymer backbone when the polymer is irradiated as a solid, solution and emulsion.

*Table III*

| Reaction Conditions | Total Energy Required For Each Chain Break (ev.) |
|---|---|
| Solid | 25 |
| 37% Aqueous emulsion | 66 |
| 25% Solution in hexane | 80 |
| 9.3% Solution in hexane | 185 |
| 3.0% Solution in hexane | 525 |

The 25 wt. percent hexane solution was so viscous it was almost solid and therefore it was difficult to handle. In comparison, the 37 wt. percent aqueous emulsion was quite fluid and could easily be moved with conventional pumps. This example of the invention shows the advantages obtained by using aqueous emulsions in the depolymerization of isobutylene-containing polymers by gamma radiation. The concentrated aqueous emulsions are free flowing and provide greatly improved energy utilization over hydrocarbon solutions of comparable viscosity.

EXAMPLE 2

An emulsion of isobutylene-isoprene butyl rubber, having a viscosity average molecular weight of 500,000 and a mole percent unsaturation of 2.0, is prepared by dispersing 100 parts by weight of the polymer in the form of a 10 wt. percent solution in pentane in 1000 parts by weight of isopropanol containing 5 parts by weight of Triton X–100 as the emulsifier. After homogenizing the mixture for 30 minutes at 30° C. in a dispersator, the raw emulsion is stripped at 40° C. under vacuum until the polymer content is 40 wt. percent. The stripped emulsion is irradiated as described in Example 1, and then is broken by addition of acetic acid. Mineral oil is added to the mixtures and the isopropanol and emulsifier are withdrawn from the polymer in the mineral oil layer. Any remaining alcohol is stripped from the oil concentrate by heating the solution and finally filtering it through a clay bed to remove trace amounts of residual emulsifiers.

It is not intended to restrict the present invention to the foregoing embodiment, but rather it should only be limited by the appended claims in which it is intended to claim all the novelty inherent in the invention.

What is claimed it:

1. A method of producing a mineral oil solution of a polymer which consists essentially of mixing a polymer having a viscosity average molecular weight of from 5,000 to 6,000,000 and containing at least 5 wt. percent isobutylene with a non-solvent liquid having the formula

ROH wherein "R" is selected from the group consisting of hydrogen, $C_1$ to $C_5$ alkyl and $C_1$ to $C_5$ hydroxyalkyl, "O" is oxygen and "H" is hydrogen, to produce a dispersion containing 30 to 60 wt. percent of said isobutylene-containing polymer, exposing said dispersion to 50,000 to 5,000,000 roentgens per hour of gamma radiation for about ½ to 24 hours thereby reducing the molecular weight of said isobutylene-containing polymer at least 5%, dissolving said polymer having a reduced molecular weight in mineral oil, separating the non-solvent liquid from said dissolved polymer, and recovering a mineral oil substantially free of said non-solvent liquid and containing said dissolved isobutylene-containing polymer.

2. Method of producing a mineral oil solution of a polymer which consists essentially of mixing a polymer having a viscosity average molecular weight of from 5,000 to 6,000,000 and containing at least 5 wt. percent isobutylene in water to produce a dispersion containing 30 to 60 wt. percent of said isobutylene-containing polymer, exposing said dispersion to 50,000 to 5,000,000 roentgens per hour of gamma radiation for about ½ to 24 hours, thereby reducing the molecular weight of said isobutylene-containing polymer at least 5%, dissolving said polymer having a reduced molecular weight in a mineral oil, separating the water from said dissolved polymer, and recovering a mineral oil substantially free of water and containing said dissolved isobutylene-containing polymer.

3. Method of claim 2 in which the isobutylene-containing polymer is a copolymer of isobutylene and a diolefin.

4. Method of claim 2 in which the molecular weight of the isobutylene-containing polymer is reduced at least 25%.

5. Method of reducing the molecular weight of polyisobutylene having a viscosity average molecular weight from 225,000 to 6,000,000 which consists essentially of exposing a 30 to 60 wt. percent aqueous emulsion of said polyisbutylene to 50,000 to 5,000,000 roentgens per hour of gamma radiation for about ½ to 24 hours to reduce its molecular weight at least 25%, dissolving said polyisbutylene reduced in molecular weight in mineral oil, separating the water from said dissolved polyisobutylene and recovering a substantially water-free mineral oil containing said dissolved polyisobutylene.

References Cited in the file of this patent

FOREIGN PATENTS

| | | |
|---|---|---|
| 818,919 | Great Britain | Aug. 26, 1959 |
| 546,817 | Belgium | Oct. 6, 1956 |

OTHER REFERENCES

Symposium on "Utilization of Radiation from Fission Products," February 23, 1953, A.E.R.E., c/R 1231, page 118.

Bovey: Effects of Ionizing Radiation on Natural and Synthetic High Polymers, 1958, pp. 114–120.

Bourne et al.: Chemistry and Industry, November 1956, pp. 1372–76.

Dainton: Nature, August 23, 1947, pp. 268–269.